United States Patent [19]

Rousculp et al.

[11] Patent Number: 5,060,882
[45] Date of Patent: Oct. 29, 1991

[54] WIRE SUPPLY REEL SUPPORT DEVICE

[75] Inventors: Eric R. Rousculp, Mentor; Lee E. Seufer, Cleveland; Ralph M. Samodell, Willoughby Hills, all of Ohio

[73] Assignee: The Lincoln Electric Company, Cleveland, Ohio

[21] Appl. No.: 505,577

[22] Filed: Apr. 6, 1990

[51] Int. Cl.⁵ .................... B65H 77/00; B65H 49/00
[52] U.S. Cl. .................... 242/99; 242/75.46; 242/129.6; 242/129.8
[58] Field of Search ............... 242/99, 68, 68.4, 75.4, 242/75.46, 129, 129.6, 129.62, 129.7, 129.71, 129.72, 129.8, 156.2

[56] References Cited

U.S. PATENT DOCUMENTS

| | | | |
|---|---|---|---|
| 4,009,845 | 3/1977 | Santucci et al. | 242/129.7 |
| 4,099,601 | 7/1978 | Pittman | 242/156.2 X |
| 4,191,342 | 3/1980 | Reinhold | 242/68 |
| 4,304,369 | 12/1981 | Landsness | 242/75.45 X |
| 4,325,522 | 4/1982 | Sauber | 242/156.2 X |
| 4,365,768 | 12/1982 | Woodruff | 242/68.4 X |
| 4,440,357 | 4/1984 | Vaughan | 242/68 X |
| 4,466,579 | 8/1984 | Nitsch et al. | 242/75.46 X |
| 4,832,282 | 5/1989 | Koike | 242/129.72 |

Primary Examiner—John M. Jillions
Attorney, Agent, or Firm—Body, Vickers & Daniels

[57] ABSTRACT

A rotative mounting arrangement for a wire supply reel off which the coiled wire thereon is fed by feed rolls comprises a reel mounting spindle axially and rotatively locked within the hub of the reel and provided at its exposed opposite ends with mounting journals for rotatively supporting the spindle in upwardly opening V-shaped trunnion type journal bearings. The spindle journals and trunnion type journal bearings are formed with axially facing cooperating bearing surfaces axially tapered at corresponding relatively steep angles to the spindle axis to have a wedge type bearing interengagement providing a self-adjusting friction drag braking action on the rotative movement of the reel that serves to prevent overrunning of the reel on stoppage of the feeding of the wire supply off the reel.

49 Claims, 5 Drawing Sheets b<c

WIRE SUPPLY REEL SUPPORT DEVICE

This invention relates in general to the art of electric arc welding and, more particularly, to apparatus for continuous arc welding using an intermittently fed flexible wire electrode.

BACKGROUND OF THE INVENTION

In one form of electric arc welding apparatus in common use at present, a flexible electrode wire coiled in a supply reel rotatably mounted on a cantilever supported shaft is fed off the reel by feed rolls to the welding head of the apparatus. The support shaft with the wire supply reel thereon are both enclosed within a housing which is provided with a pivoted overhead and/or side door that can be swung out of the way to permit the axial sliding of the reel onto and off the free end of the cantilever supported shaft. Owing to the normally appreciable size and weight of a reel with a full supply of electrode wire coiled thereon, a sturdy support must be provided for the supported end of the cantilever mounted shaft, and the swing door must be of corresponding appreciable and cumbersome size.

To prevent overrunning of the rotated reel upon each stoppage of the feeding of the electrode wire off the reel by the feed rolls, with resulting unwinding of a portion of the remaining coiled wire from the reel and possible displacement of such unwound wire portion off the sides of the reel, the reel supporting shaft in such prior forms of electric arc welding apparatus have been customarily provided with a manually adjustable spring controlled friction brake means for frictionally engaging shoe elements incorporated in the shaft with the inside wall of the hub portion of the reel to thereby exert a frictional drag braking action thereon during the rotation of the reel by the electrode wire drawn off therefrom by the feed rolls. Because of the higher rotational inertia of a reel with a fuller supply of coiled wire thereon, more brake force is required to be applied thereto to prevent overrunning of the reel, on each stoppage of the feeding of the electrode wire off the reel by the wire feed rolls, than is required to prevent overrunning of a reel with a reduced wire coil diameter. This then results in a higher wire feed force being applied to the coiled wire on the reel as the wire coil diameter reduces.

With such prior cantilever shaft supported electrode wire reel support arrangements, moreover, the replacement of an emptied reel by one containing a full supply of electrode wire coiled thereon becomes a rather complicated and time consuming operation. To replace an emptied reel, the closed door of the housing must first be swung to its open position to permit sliding movement of the emptied reel endwise off the free end of the cantilever supported reel mounting shaft, after which the fastening means, such as threaded end cap or fastening nut holding the reel in place on the shaft, must then be removed to free the emptied reel for sliding movement endwise off the free end of the support shaft. After sliding of a replacement reel containing a further supply of electrode wire onto the support shaft into proper position thereon, the replacement reel must then be fastened in place on the shaft and the closure door then swung back to its closed position. Thus, it will be appreciated that the replacement of an emptied electrode wire supply reel by one containing a new supply of electrode wire becomes a rather involved and time consuming operation.

SUMMARY OF THE INVENTION

The present invention contemplates a new and improved reel support device for rotatably supporting the electrode wire supply reel of an electric arc welding apparatus which overcomes all of the above referred to problems and others and provides an improved reel support arrangement which is of simple construction and efficient in operation and which is adapted to receive the reel in rotative mounted position thereon simply by a downward placement of the reel together with an associated mounting spindle into rested journaled position within a pair of upwardly opening trunnion type support journal bearings of the reel support arrangement.

Briefly stated, in accordance with a principal aspect of the invention, the improved reel support arrangement provides a self-adjusting frictional drag braking action on the rotative movement imparted to the reel by the drawing off of the electrode wire from the reel by the wire feed rolls of the welding apparatus. The frictional drag braking action prevents rotational overrunning movement of the reel with consequent uncoiling of the wound wire supply upon stoppage of the feeding of the electrode wire off the reel by the wire feed rolls of the apparatus. The self-adjusting frictional drag braking action is afforded by forming at least one of the trunnion type support journals or bearings for the reel and its associated mounting spindle of upwardly opening V-shaped form, with an axially facing rest bearing surface tapered at a relatively steep angle to the horizontal axis of rotation of the reel mounting spindle, and by forming the cooperating annular end journal of the spindle as an annular groove for receiving therein the axially tapered rest bearing surface of such one trunnion support bearing, the annular groove end journal of the spindle having an axially facing annular bearing surface tapered at a corresponding steep angle to the axis of rotation of the spindle for wedged bearing engagement of the tapered rest bearing surface of the one trunnion support bearing within and between the facing sides of the tapered annular end bearing groove of the spindle. To assure the wedged bearing engagement of the V-shape trunnion support bearing at all times with and between the facing annular sides of the annular bearing groove in the spindle end, the diameter of the annular end bearing groove of the spindle must be so dimensioned relative to the V-shape trunnion support bearing as to rest in bearing engagement therewith only at points located along the upwardly flaring side leg portions thereof and not rest against the bottom or bight portion of the V-shape trunnion support bearing. The combination of the V-shape trunnion type rest bearing and the axially tapered interengaged bearing surfaces of the spindle and trunnion rest bearing provides a wedge type bearing engagement therebetween which produces a frictional resistance to and consequent braking drag action on the rotational movement of the spindle and associated reel by the turning torque applied thereto by the electrode wire as it is fed off the reel by the feed rolls of the welding apparatus, which braking drag force then effectively prevents overrunning of the rotated reel with undesired further uncoiling of the electrode wire from the reel on stoppage of the feeding of the electrode wire supply by the feed rolls.

Because of the decrease in the torque arm of the feed roll wire feeding force applied to the reel by the fed off wire and also due to the decrease in the weight of the reel as more and more of the coiled wire on the reel is withdrawn therefrom, the frictional braking force applied to the rotated reel and associated spindle by the wedge type interengaged spindle and trunnion bearing surface is correspondingly proportionally reduced, thus affording self-adjusting braking drag action on the rotational movement of the reel to prevent overrunning thereof on a stoppage of the feeding of the electrode wire off the feed roll by the wire feed rolls of the welding apparatus, and assuring a uniform rate of feeding of the electrode wire off the reel at all times by the feed rolls.

In accordance with another aspect of the invention, both of the annular end bearings of the spindle are formed by identical annular grooves each having a respective axially tapered annular side bearing surface tapered at the same steep angle to the axis of rotation of the spindle, and the cooperating trunnion support bearings are both formed of identical upwardly opening V-shape each having an axially facing rest bearing surface tapered at the same steep angle as that of the tapered annular side bearing surface of the cooperating annular end bearing groove of the spindle for bearing engagement therewith. With this identical frictional bearing drag arrangement for both ends of the reel mounting spindle, substantially the same degree of frictional drag braking action is thereby imparted to both ends of the spindle to prevent overrunning of the spindle on stoppage of the feeding of the electrode wire off the reel by the feed rolls of the welding apparatus.

In accordance with still another aspect of the invention, the reel mounting spindle is axially fitted within a hub opening in the reel and is provided with axially concentric circular outer end portions projecting outwardly beyond the opposite side faces of the reel and formed with respective annular bearing grooves the axially inward facing sides of which form the axially tapered spindle bearing surfaces and the axially outward facing sides of which are disposed in planes extending normal to the axis of rotation of the spindle. Such shaped annular end bearing grooves on the spindle affords the wedge type bearing engagement of the tapered V-shape trunnion rest bearing surfaces therewith.

In accordance with a further aspect of the invention, the reel mounting spindle and the trunnion support bearing members therefor are both made of molded thermoplastic, preferably of different thermoplastics to prevent squeaking of the bearings during rotation of the reel therein. In this regard, the spindle is preferably made of molded acetal plastic while the trunnion support bearing members are preferably made of molded nylon plastic.

In accordance with a still further aspect of the invention, the spindle is provided with locking means to axially lock it in proper axially inserted position within the spindle receiving hub opening of the reel. The locking means comprises a radially outward extending annular flange located on one end of the spindle axially inward of the annular end bearing at that one spindle end for abutting engagement against one end of the reel hub, and a first cantilever spring arm on the spindle extending axially thereof beyond the other hub end and recessed within an axially extending radially outward opening recess in the spindle. The free end of the cantilever spring arm is provided with a detent located axially inwardly of the annular bearing on the other end of the spindle and snap locked over the other end of the spindle receiving hub of the reel. In the case where the spindle is formed as a molded plastic member, the first cantilever spring arm is preferably integrally molded thereon.

According to another aspect of the invention, the reel support spindle is provided with a second cantilever spring arm for axially retaining in place on the spindle a narrower width wire supply reel that would not be engaged and locked in place on the spindle by the first cantilever spring arm. The second cantilever spring arm extends axially inward of the spindle from the one spindle end at a location therearound approximately diametrically opposite the first cantilever spring arm thereon and is recessed within a second axially extending radially outward opening recess in the spindle and is provided with a detent at its free end located around the midpoint of the length of the spindle for engagement with the hub of such narrower width wire supply reels. Where the spindle is formed as a molded plastic member, the second cantilever spring arm is also preferably integrally molded thereon.

In accordance with still another aspect of the invention, the spindle and associated reel are provided with interlocking means for locking them together against relative rotational movement. The interlocking means comprises a radially extending locking arm located on one end of the spindle axially inward of the annular bearing thereof at that one spindle end and provided at its radially outer end with a locking pin extending axially inward of the spindle and slidably fitted within a matching recess provided in the facing side of the reel. Preferably, the locking arm is integrally molded on the molded plastic spindle and extends radially outward from the annular flange on the spindle that forms a part of the locking means for axially locking the spindle in place within the bore opening of the reel hub.

In accordance with a further aspect of the invention, the V-shaped trunnion type rest support bearings for the reel mounting spindle are formed at the upper ends of a pair of horizontally opposed flat shaped parallel support posts of molded plastic upstanding from the horizontal base plate portion of a U-shaped metal plate support frame provided with a pair of opposed parallel support arm portions upstanding from the base plate portion and to the facing inner sides of which the plastic support posts are respectively secured flatwise thereagainst.

It is a principal object of the invention to provide an improved rotative mounting arrangement for the wire supply reel of apparatus involving the feeding of indeterminate lengths of wire off the reel, which mounting arrangement is of simple construction and affords quick and easy reel installation and replacement of emptied reels.

Another object of the invention is to provide a wire supply reel rotative mounting arrangement of the character referred to above which affords a self-adjusting friction drag braking action on the rotative movement of the reel by the wire fed off therefrom to prevent overrunning of the reel on stoppage of the feeding of the wire off the reel by the feed rolls of the associated apparatus.

Still another object of the invention is to provide a wire supply reel rotative mounting arrangement of the character referred to above which affords a friction drag braking action on the rotative movement of the reel by the wire fed off therefrom and which does not require any adjustment of the friction drag braking means as more and more of the wire is fed off the reel.

A further object of the invention is to provide a wire supply reel rotative mounting arrangement of the character referred to above affording a friction drag braking action which automatically decreases in degree as more and more of the coiled wire on the reel is fed off therefrom by the wire feeding means of the apparatus, whereby decreased rotational inertia of the wire supply reel need be overcome by the braking action.

Further objects and advantages of the invention will appear from the following detailed description of a preferred species thereof and from the accompanying drawings.

DESCRIPTION OF THE PREFERRED EMBODIMENT

Figure 1:
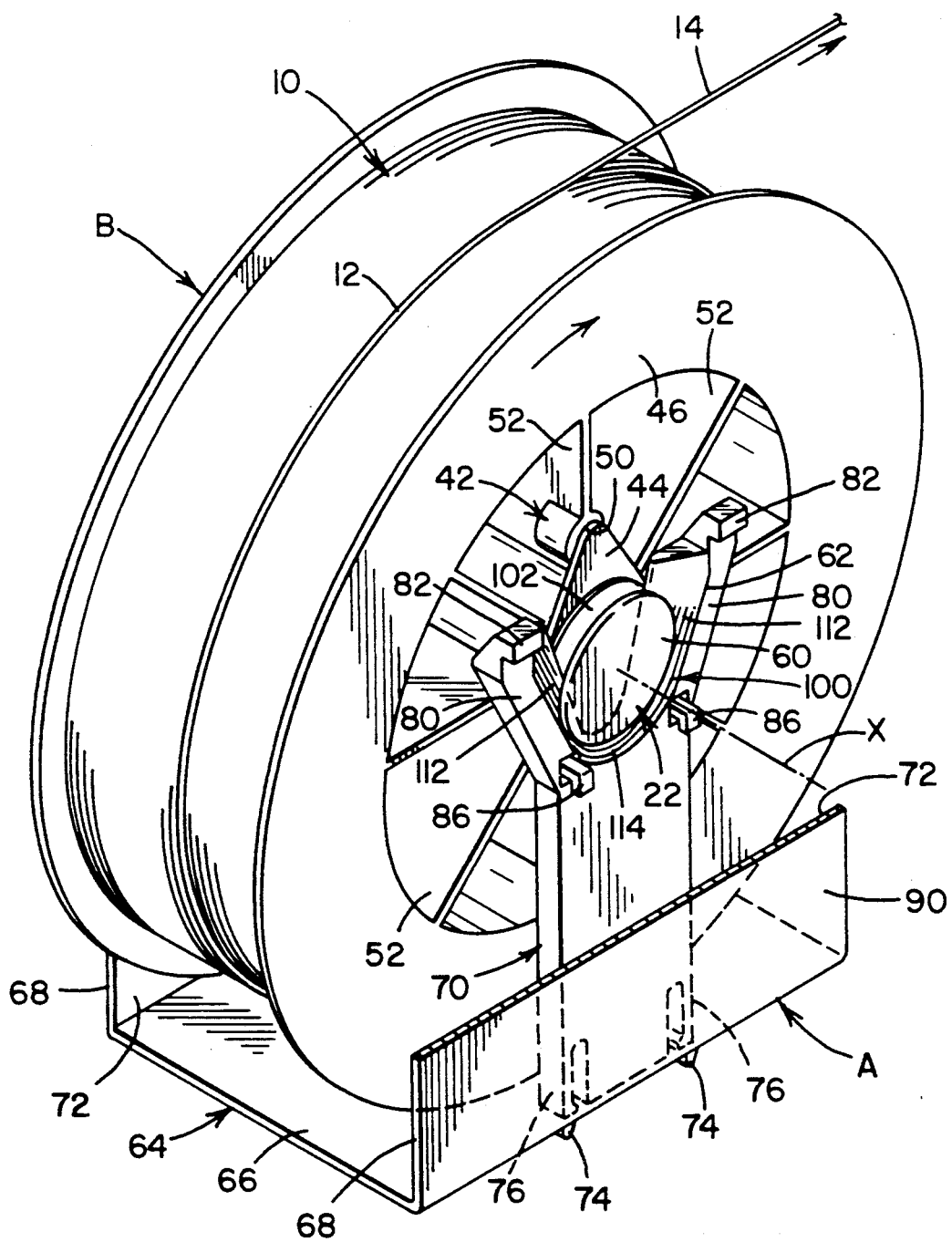
FIG. 1 is a perspective view of a reel support device according to the invention shown partly broken away and showing a wire supply reel in mounted position thereon.

Referring now to the drawings wherein the showings are for the purposes of illustrating the preferred embodiment of the invention only and not for the purposes of limiting the same, the figures show a rotative support device or mounting arrangement A for a reel means B having a supply 10 of flexible wire 12 coiled thereon such as the flexible electrode wire commonly used for intermittently feeding the free end 14 of the wire supply 10 to the welding head of a conventional type electrical arc welding apparatus (not shown) by a pair of feed rolls thereof. It should be understood, however, that the invention can be used as well in other types of apparatus requiring a flexible wire to be fed off a rotatably mounted wire supply reel. While the particular reel means B shown is, for simplicity purposes, illustrated as comprised simply of a single flanged reel with an axial outer drum portion 16 on which the wire supply 10 is coiled, it may be comprised instead of an inner reel having an axial outer drum portion 16 onto which an outer reel carrying the coiled wire supply 10 is axially slid and locked in place. The reel means B is provided with a centrally located hub portion 18 provided with an axially extending bore opening 20 and, as shown, is made of molded plastic.

Figure 3:
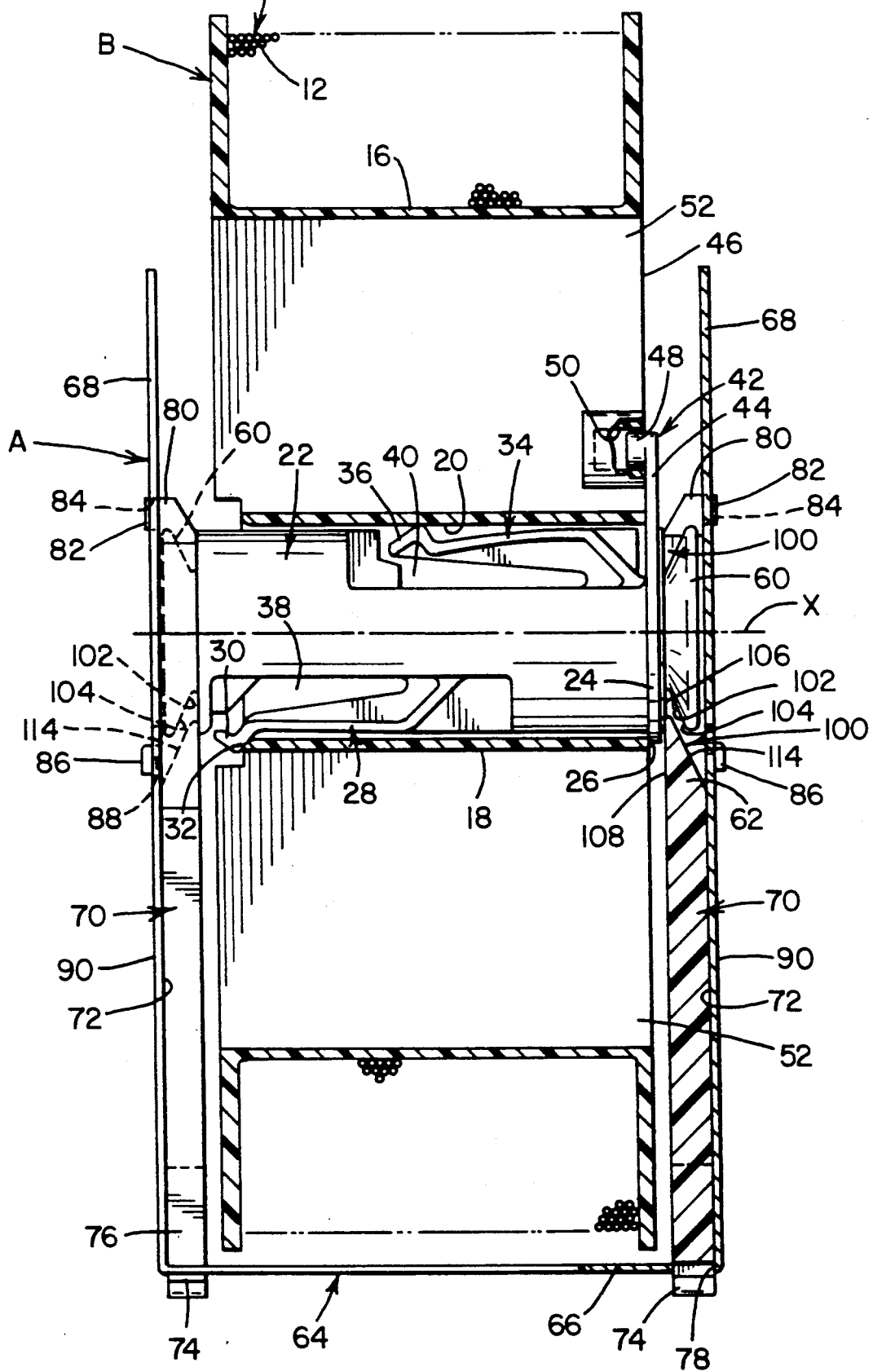
FIG. 3 is a vertical sectional view on the line 3—3 of FIG. 2 and on an enlarged scale.
Figure 4:
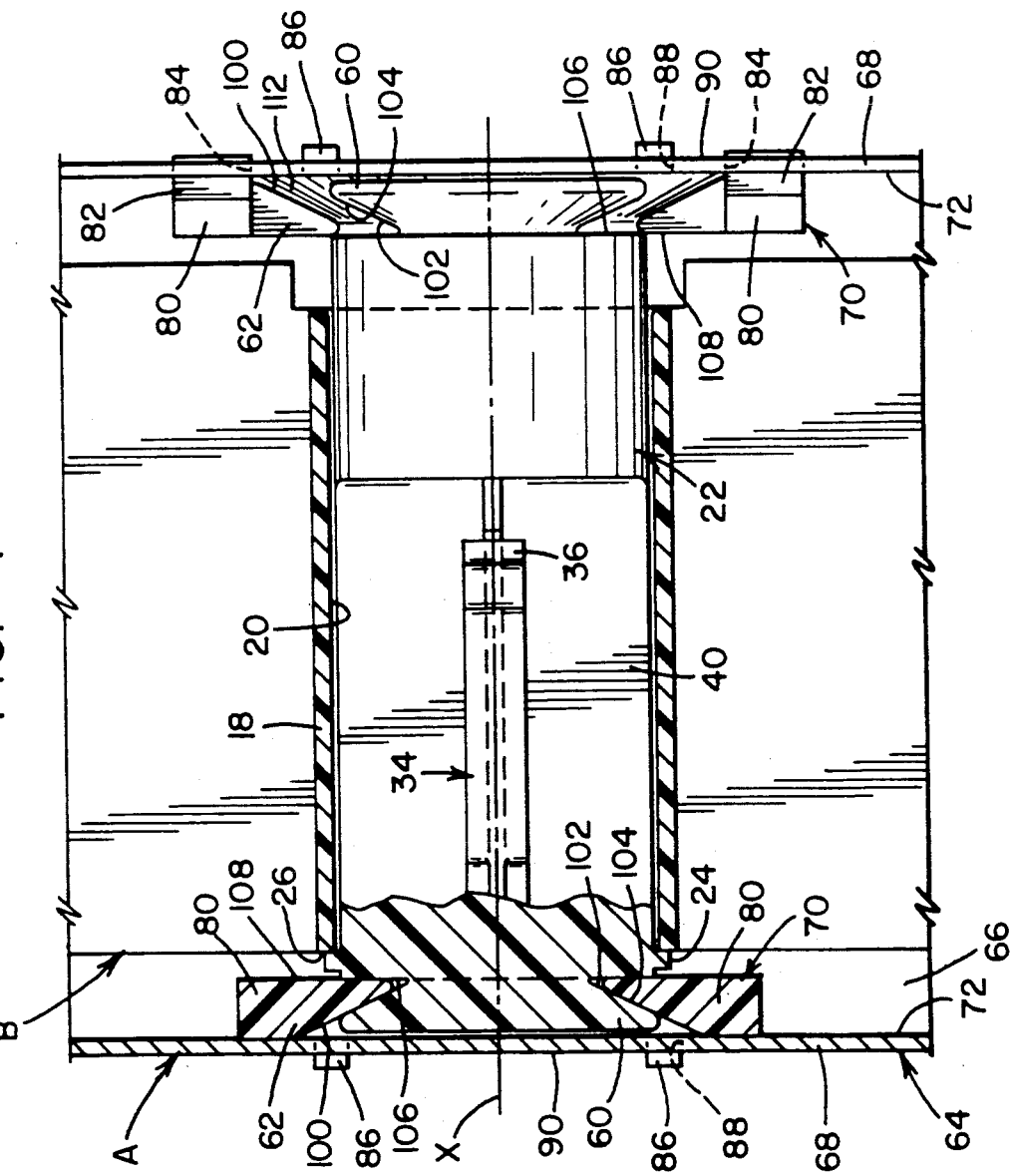
FIG. 4 is a plan view on an enlarged scale and partly taken in horizontal section on the line 4—4 of FIG. 2; and, FIGS. 5 and 6 are schematic side views of a reel of supply wire and respectively showing the degree of rotation of the reel to feed off the same unit length of supply wire from a reel with a full supply of wire coiled thereon and from a reel with a nearly empty supply of wire coiled thereon.

The reel B is provided with a mounting spindle 22 slidably fitted within the bore opening 20 of the reel for rotatably mounting it in place on the fixed support device A. The spindle 22 comprises a molded plastic elongated member preferably made of acetal plastic, and extends axially through and is axially locked in place within the bore opening 20 of the reel by locking means comprising an annular flange 24 on one end of the spindle and abutted against one end 26 of the reel hub portion 18 and a first cantilever spring arm 28 integrally molded on the spindle and extending generally axially thereof and provided at its free end with a detent 30 snap locked over the other end 32 of the spindle hub portion 18 (FIG. 3). The spindle 22 is provided with a second cantilever spring arm 34 for engaging and locking on the spindle 22 narrower reels B which would not be engaged and locked in place thereon by the first cantilever spring arm 28. The second spring arm 34 is also integrally molded on the spindle and extends axially thereof from the said one end thereof at a location therearound approximately diametrically opposite the first cantilever spring arm 28. The second spring arm 34 is also provided at its free end with a detent 36 located around the midpoint of the length of the spindle, for engagement with the hub of such narrower width reels B. The cantilever spring arms 28 and 34 also act to maintain the spindle 22 more or less in axial centered position in the cylindrical bore opening 20 of the reel hub portion 18. The two cantilever spring arms 28 and 34 are recessed in axially extending, radially outward opening recesses 38 and 40, respectively, formed in the spindle 22.

Interlocking means 42 are provided on the reel B and spindle 22 for rotatively locking them against relative rotational movement. The interlocking means 42 comprises a radially outward extending arm 44 extending from one end of the spindle 22, preferably from the annular flange 24 thereon, alongside one of the sides 46 of the reel B and provided at its radially outer end with a locking pin 48 extending axially inward of the spindle and slidably fitted within a matching recess 50 provided in one of the radial spokes 52 that join the drum portion 16 of the reel to the hub portion 18 thereof.

The spindle 22 is provided at its opposite ends with journals 60 for supporting the spindle and its associated reel B for rotation about the longitudinal axis X of the spindle. In accordance with the invention, the spindle 22 and its associated reel B are mounted for such rotation with the spindle axis X disposed horizontally, within a pair of spaced, upwardly opening, V-shape trunnion type journal bearings 62 of the support device A that permit the mounting of the spindle and its associated reel B in the journal bearings 62 simply by a downward placement movement thereof into resting bearing engagement of the spindle journals 60 within the journal bearings 62 of the support device A. With such a reel mounting arrangement, the installation of the reel B and mounting spindle 22 in their rotatively supported position in the welding apparatus and their replacement can be easily and quickly performed as compared to the reel rotative mounting procedure required with prior conventional welding apparatus involving endwise assembly of the electrode wire supply reel onto, and removal from, a cantilever mounted support shaft, as described hereinabove.

The reel support device A comprises a U-shaped metal plate support frame 64 having a horizontally disposed base plate portion 66 and a pair of vertically extending support arm portions 68, 68 upstanding from the base plate portion 64 in spaced opposed parallel relation to each other. A pair of flat-shaped support post members 70, 70 are mounted flatwise on and against the facing inner sides 72, 72 of the respective frame support arm portions 68, 68. The support post members 70, 70 are made of a suitable molded thermoplastic, preferably nylon plastic, and rest at their lower end on the base plate portion 66 of the support frame 64 and are secured thereto by detents 74 which are provided at the lower ends of a pair of vertically extending spring arm portions 76 on each of the support post members 70, 70 and which extend through openings 78 in the base plate portion 66 and are snap-locked under the bottom side thereof.

The support post members 70, 70 are bifurcated at their upper ends to form a pair of upwardly flared out V-shape journal bearing support arms 80, 80 on each support post member. At their upper end extremities, the V-shape journal bearing support arms 80, 80 are each provided with an anchor pad 82 which is fitted snugly within a matching aperture 84 in the respective upstanding support arm portion 68 of the support frame 64 to securely anchor the upper end extremities of the V-shape bearing support arms 80, 80 in place on the support arm portions 68 of the support frame 64 against their being spread apart by the bearing load placed thereon by the wire supply reel B and associated spindle 22 which are journaled in and between the V-shape bearing support arms 80. To hold the upper end portions of the support post members 70 firmly against the inner sides 72 of the respective upstanding support arm portions 68 of the support frame 64, the support post members are each provided with a pair of L-shape locking lugs 86 which project outwardly from the lower regions of their V-shape bearing support arms 80 and which extend through apertures 88 in the upstanding support arm portions 68 of the support frame 64 and extend downwardly and engage against the outer sides 90 of the support arm portions.

In accordance with the invention, the spindle journals 60 and the supporting journal bearings 62 therefor are constructed to provide a wedge-type bearing engagement therebetween which affords a self-adjusting friction drag braking action on the rotative movement imparted to the wire supply reel B by the wire 14 as it is drawn off the reel by the feed rolls of the welding apparatus. The friction drag braking action of the journal bearings 62 on the spindle journals 60 prevents rotational overrunning movement of the reel B with consequent undesired excess uncoiling of wire from the wound supply 10 thereof on the reel upon a stoppage of the feeding of the wire 14 off the reel by the wire feed rolls of the welding apparatus.

The wedge type bearing engagement of the journal bearings 62 with the spindle journals 60 is afforded by forming each of the V-shape trunnion type support journal bearings 62 of the support post members 70 with axially outward facing rest bearing surfaces 100 correspondingly axially tapered at a relatively steep angle ranging from about 60° to 70°, and preferably at about 65°, to the horizontal axis X of rotation of the spindle 22, and by forming the cooperating spindle journals 60 by annular bearing grooves 102 the axially inward facing sides 104 of which constitute bearing surfaces which are correspondingly axially tapered at the same relatively steep angle to the horizontal axis X of rotation of the spindle as the tapered rest bearing surfaces 100 of the V-shape trunnion type support journal bearings 62 of the support post members 70 for cooperating wedge type bearing engagement therewith. The axial outward facing sides 106 of the annular end bearing grooves 102 in the spindle 22 and the inner side faces 108 of the V-shape bearing support arms 80 of the support post members 70 extend normal to the axis X of rotation of the spindle 22 and are aligned with one another axially of the spindle for sliding interengagement with each other on fitting of the wedge shape trunnion type journal bearings 62 within the tapered annular end bearing grooves 102 of the spindle 22 during the mounting of the spindle and associated reel B on the reel support device A.

Figure 2:
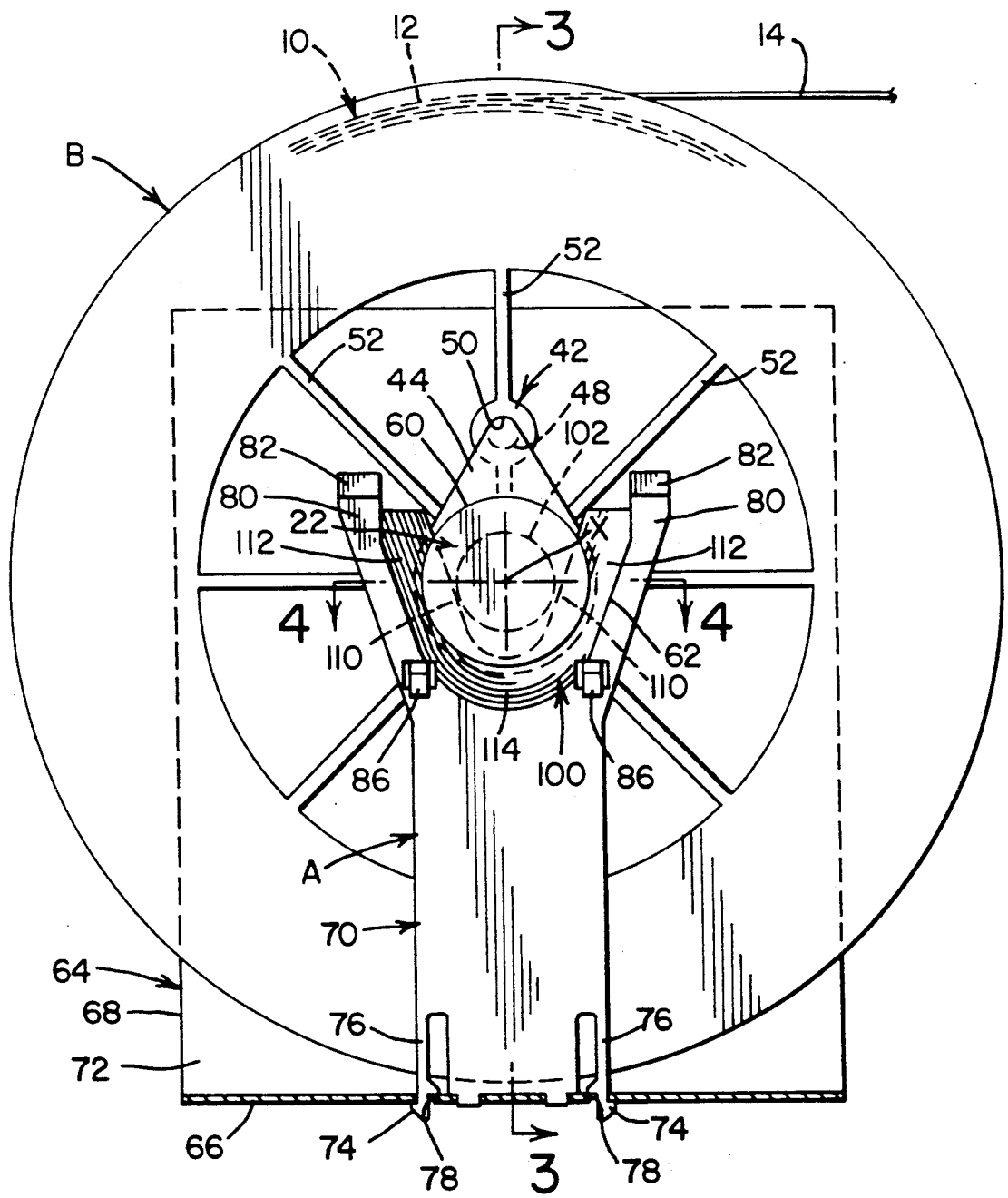
FIG. 2 is an elevational view partly shown in section of the reel support device shown in FIG. 1.

To assure the wedged bearing engagement of the V-shape trunnion support journal bearings 62 at all times within and between the facing annular sides 104 and 106 of the spindle annular groove end journals 60, the diameter of the annular end bearing grooves 102 of the spindle 22 must be so dimensioned relative to the V-shape trunnion support journal bearings 62 as to rest in bearing engagement with the axially tapered rest bearing surfaces 100 thereof only at points 110 located along the upwardly flaring side leg portions 112 of the axially tapered rest bearing surfaces 100, as shown in FIG. 2, and not rest against the arcuate bottom or bight portions 114 of the tapered rest bearing surfaces 100. During the rotation of the wire supply reel B and its mounting spindle 22 by the electrode wire 14 drawn off the reel A by the feed rolls of the welding apparatus, the weight of the reel and associated spindle produces a frictional drag force in the wedge type bearing interengagement between the spindle journals 60 and the trunnion support journal bearings 62 which prevents overrunning of the reel and undesired further uncoiling of the coiled wire therefrom on a stoppage of the feeding of the wire 14 off the reel by the feed rolls of the welding apparatus.

Due to the decrease in the torque arm of the feed roll wire feeding force applied to the reel by the fed off wire 14 and also due to the decrease in the weight of the reel as more and more of the coiled wire on the reel is withdrawn therefrom, the frictional braking force applied to the rotated reel and associated spindle by the wedge type interengaged spindle journals and trunnion journal bearings is correspondingly proportionally reduced, thus affording self-adjusting friction drag braking action on the rotational movement of the reel to prevent overrunning thereof on a stoppage of the feeding of the coiled wire off the wire supply reel B by the wire feed rolls of the welding apparatus.

Figure 5:
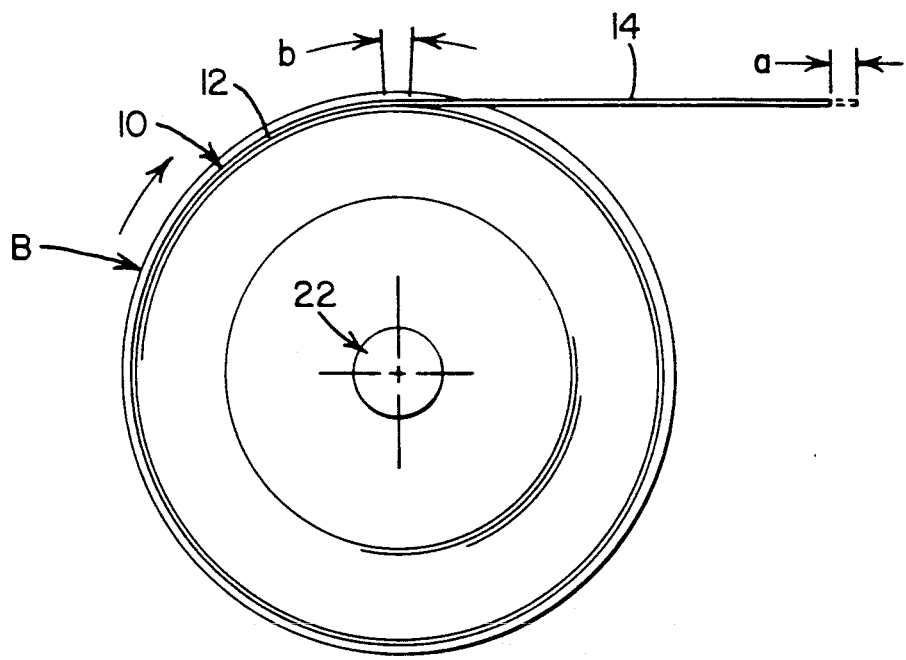
Figure 6:
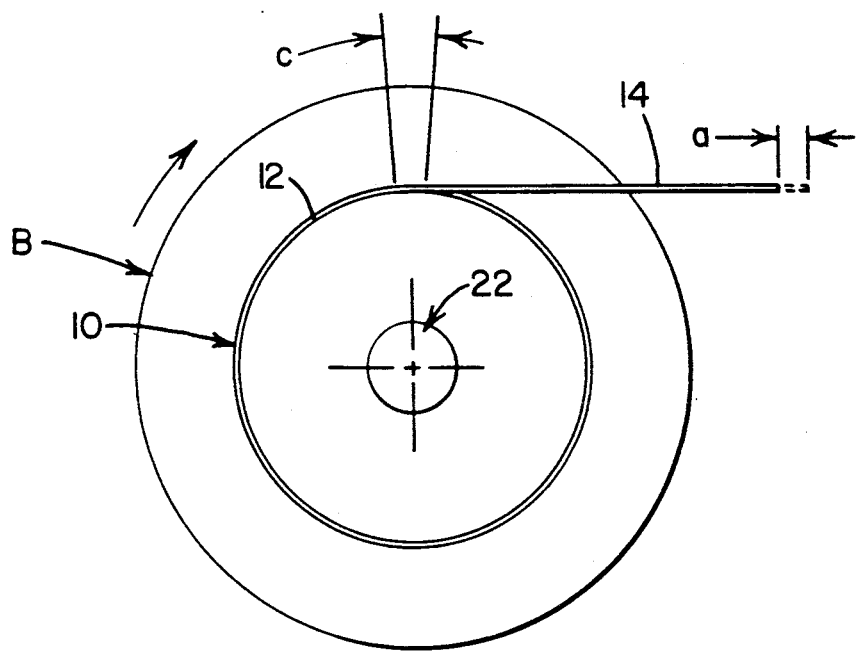

FIGS. 5 and 6 illustrate the increased rotational movement of the wire reel B required to feed the same unit length a of wire 14 off the reel with decreasing torque arm of the force couple applied to the reel by the fed off wire 14 as more and more of the coiled wire supply 10 on the reel is fed off therefrom. The arc c through which a reel B with a nearly empty supply 10 of wire 12 (FIG. 6) must be rotated to uncoil therefrom a given unit length a of wire fed from the reel is greater than the arc b through which a reel B with a full supply 10 of coiled wire 12 must be rotated to uncoil therefrom the same unit length a of wire. Thus, the frictional drag action of the engaged wedge type friction bearing surfaces 100 and 104 of the trunnion journal bearings 62 and spindle journals 60 required to prevent a given amount of overrunning of the reel B, on stoppage of the wire feeding by the feed rolls of the welding apparatus, is less for a nearly emptied reel B than that required for a reel provided with a full supply 10 of coiled wire 12. The self-adjusting friction braking action imparted to the reel B by the engaged wedge type bearing surfaces 100 and 104 of the V-shape trunnion journal bearings 62 and spindle journals 60 according to the invention automatically affords such reduced frictional braking action on the rotative movement of the spindle journals 60 and its associated reel B as more and more of the coiled wire 12 on the reel is uncoiled therefrom.

Besides affording the above-mentioned self-adjusting friction braking action on the rotative movement of the reel B by the wire 14 drawn off therefrom by the feed rolls of the welding apparatus, the reel supporting device A according to the invention affords easy and quick mounting of the wire supply reel B, and replacement of an emptied reel B with one containing a full supply 10 of coiled electrode wire 12 without the possible need of adjusting any friction drag braking means for the reel such as may be required with prior cantilever shaft type reel mounting devices. The mounting of the reel B in rotative position on the support device A therefore can be performed by simply lowering the reel B and its associated mounting spindle 22 into rested bearing engagement in the journal bearings 62 of the support device A.

The formation of the spindle 22 and the support posts 70 of the reel support device A as molded plastic members formed of different synthetic thermoplastics, preferably of acetal plastic and nylon plastic respectively, prevents annoying squeaking of the spindle journals 60 in their journal bearings 62 during the rotational movement of the spindle and its associated reel B in the journal bearings.

The invention has been described with reference to the preferred embodiment thereof. Obviously, modifications and alterations will occur to others upon the reading and understanding of this specification. It is my intention to include all such modifications and alterations insofar as they come within the scope of the appended claims or the equivalents thereof.

Having thus described the invention, it is claimed:

1. A support device for rotatably supporting a reel means for intermittently withdrawing therefrom given lengths of wire wound thereon, said reel means having a hub with an axial bore opening, said support device comprising: a spindle slidably fitted and axially and rotatively locked in place within the said bore opening of said reel means, said spindle having axially aligned circular bearing surface means at its opposite ends located outboard of the respective outer sides of said reel means for rotatively mounting said reel means, and a pair of trunnion journal bearings having rest bearing surface means of upwardly opening V-shape with flaring side portions within which the said spindle circular bearing surface means is in resting bearing engagement only with said flaring side portions and is adapted to be vertically rested to support said spindle and associated reel means for rotation about a horizontal axis, said trunnion rest bearing surface means having a wedge type bearing interengagement with the cooperating one of said spindle circular bearing surface means to provide a self-adjusting friction drag braking action on the rotative movement of said reel means by the wire drawn off therefrom to stop overrunning of the reel means on stoppage of the feeding of said wire off the reel means.

2. A support device as defined in claim 1, wherein the said trunnion rest bearing surface means of both said trunnion journal bearings have the said wedge type bearing interengagement with the cooperating ones of said spindle circular bearing surface means.

3. A support device for rotatably supporting a reel means for intermittently withdrawing therefrom given lengths of wire wound thereon, said reel means having a hub with an axial bore opening, said support device comprising: a spindle slidably fitted and axially and rotatively locked in place within the said bore opening of said reel means, said spindle having axially aligned circular bearing surface means at its opposite ends located outboard of the respective outer sides of said reel means for rotatively mounting said reel means, and a pair of trunnion journal bearings having rest bearing surface means of upwardly opening V-shape with flaring side portions within which the said spindle circular bearing surface means is in wedged resting bearing engagement only on said flaring side portions and is adapted to be vertically rested to support said spindle and associated reel means for rotation about a horizontal axis, said trunnion rest bearing surface means, together with the cooperating spindle bearing surface means, are correspondingly tapered at a relatively steep angle to the said axis of rotation of said spindle, said spindle bearing surface means being in resting bearing engagement only with the said flaring side portions of said V-shape trunnion rest bearing surface means.

4. A support device as defined in claim 3, wherein the said one V-shape trunnion rest bearing surface means and the cooperating one of said spindle bearing surface means are tapered at a corresponding angle of from about 60° to 70° to the said axis of rotation of said spindle.

5. A support device as defined in claim 3, wherein the said one V-shape trunnion rest bearing surface means and the cooperating one of said spindle bearing surface means are correspondingly tapered at an angle of about 65° to the said axis of rotation of said spindle.

6. A support bearing as defined in claim 3, wherein the said tapered flaring side portions of the said one V-shape trunnion rest bearing surface means and the cooperating said tapered one of said spindle bearing surface means respectively face axially outward and inward of said spindle.

7. A support bearing as defined in claim 3, wherein the said circular bearing surface means on said spindle and the said trunnion journal bearings are both formed of molded thermoplastic.

8. A support bearing as defined in claim 3, wherein the said spindle and the said trunnion journal bearings are both formed of molded thermoplastic.

9. A support bearing as defined in claim 3, wherein the said spindle is formed of molded acetal thermoplastic and the said trunnion journal bearings are formed of molded nylon thermoplastic.

10. A support device as defined in claim 3, wherein the said flaring side portions of said V-shape trunnion rest bearing surface means are flared upwardly and outwardly at equal angles ranging from about 15° to 25° to the vertical.

11. A support device as defined in claim 3, wherein the said flaring side portions of said V-shape trunnion rest bearing surface means are flared upwardly and outwardly at equal angles of approximately 18° to the vertical.

12. A support device as defined in claim 3, wherein both of the said trunnion support bearings have rest bearing surface means of upwardly opening V-shape with flaring side portions and, together with the respective cooperating ones of said spindle bearing surface means, are correspondingly tapered at the same relatively steep angle to the said axis of rotation of said spindle, said spindle bearing surface means at the opposite ends of said spindle both being in resting bearing engagement only with the said flaring side portions of the respective V-shape trunnion rest bearing surface means.

13. A support device as defined in claim 12, wherein the said V-shape trunnion rest bearing surface means are tapered at corresponding angles of from about 60° to 70° to the said axis of rotation of said spindle.

14. A support device as defined in claim 12, wherein the said V-shape trunnion rest bearing surface means and the cooperating ones of said spindle bearing surface means are correspondingly tapered at an angle of about 65° to the said axis of rotation of said spindle.

15. A support bearing as defined in claim 12, wherein the said tapered flaring side portions of each of the said V-shape trunnion rest bearing surface means and the cooperating tapered said spindle bearing surface means respectively face axially outward and inward of said spindle.

16. A support device as defined in claim 12, wherein the said spindle and the said trunnion support bearings are each formed of molded thermoplastic.

17. A support device as defined in claim 12, wherein the said spindle is formed of molded acetal thermoplastic and the said trunnion support bearings are formed of molded nylon thermoplastic.

18. A support device as defined in claim 12, wherein the said flaring side portions of both said V-shape trunnion rest bearing surface means are flared upwardly and outwardly at equal angles ranging from about 15° to 25° to the vertical.

19. A support device as defined in claim 12, wherein the said flaring side portions of both said V-shape trunnion rest bearing surface means are flared upwardly and outwardly at equal angles of about 18° to the vertical.

20. A support device as defined in claim 12, wherein the said spindle is provided at its opposite ends with axially concentric circular outer end portions projecting outwardly beyond the opposite sides of said reel means and formed with respective annular bearing grooves the axially inward facing sides of which form the said tapered spindle bearing surface means.

21. A support device as defined in claim 12, and further including interlocking means on said spindle and reel means for locking them against relative rotational movement, said interlocking means comprising a radially extending locking arm on one end of said spindle provided at its radially outer end with a locking pin extending axially inward of the spindle and slidably fitted within a matching recess provided in the adjacent facing side of said reel means.

22. A support device for rotatably supporting a reel means for intermittently withdrawing therefrom given lengths of wire wound thereon, said reel means having a hub with an axial bore opening, said support device comprising: a spindle slidably fitted and axially and rotatively locked in place within the said bore opening of said reel means, said spindle having axially aligned circular bearing surface means at its opposite ends located outboard of the respective outer sides of said reel means for rotatively mounting said reel means, and a pair of trunnion journal bearings having rest bearing surface means within which the said spindle bearing surface means is adapted to be vertically rested to support said spindle and associated reel means for rotation about a horizontal axis, at least one of said trunnion rest bearing surface means being of upwardly opening V-shape with flaring side portions and, together with the cooperating one of said spindle bearing surface means, are correspondingly tapered at a relatively steep angle to the said axis of rotation of said spindle, said one spindle bearing surface means being in resting bearing engagement only with the said flaring side portions of said V-shape trunnion rest bearing surface means, both of said trunnion support bearings having rest bearing surface means of upwardly opening V-shape with flaring side portions and, together with the respective cooperating ones of said spindle bearing surface means, are correspondingly tapered at the same relatively steep angle to the said axis of rotation of said spindle, said spindle bearing surface means at the opposite ends of said spindle both being in resting bearing engagement only with the said flaring side portions of the respective V-shape trunnion rest bearing surface means; and locking means for axially locking said spindle within the said bore opening in the said hub of said reel means, said locking means comprising an annular flange located on one end of said spindle axially inward of the said spindle bearing surface means at said one spindle end and abutting against one end of said hub, and a first cantilever spring arm on said spindle extending axially thereof and having a detent at its other end snap-locked over the other end of said hub.

23. A support device as defined in claim 22, wherein the said spindle is formed of molded plastic and the said first cantilever spring arm is integrally molded on said spindle.

24. A support device as defined in claim 22, wherein said spindle is provided with a second cantilever spring arm extending axially thereof at a location therearound approximately diametrically opposite said first cantilever spring arm and provided with a detent at its free end located generally midway of the axial extent of said spindle for engaging with the said hub of narrower width said reel means mounted on said spindle.

25. A support device as defined in claim 24, wherein the said spindle is formed of molded plastic and both said first and second cantilever spring arms are integrally molded on said spindle.

26. A support device as defined in claim 24, wherein the said second cantilever spring arm extends from said spindle in a direction axially thereof away from the said annular flange on the spindle.

27. A support device as defined in claim 22, wherein said spindle is formed of molded thermoplastic and said annular flange is integrally molded thereon, and interlocking means are provided on said spindle and reel means for locking them against relative rotational movement, said interlocking means comprising a locking arm integrally molded on said spindle and extending radially outward from the said annular flange on said spindle and provided at its radially outer end with a locking pin extending axially inward of the spindle and slidably fitted within a matching recess provided in the adjacent facing side of said reel means.

28. A support device for rotatably supporting a reel means for withdrawing therefrom given lengths of wire wound thereon, said reel means having a hub with an axial bore opening, said support device comprising: a U-shaped metal plate support frame on which the said reel means is rotatably mounted, said frame comprising a base plate portion and a pair of support arm portions upstanding from the base plate portion in spaced opposed parallel relation to each other, a pair of flat shaped molded plastic support post members mounted flatwise on and against the facing sides of the respective said frame support arm portions in opposed relation to each other for rotatably supporting said reel means therebetween for rotation about a horizontal axis, said support post members being provided at their upper ends with horizontally opposed upwardly opening trunnion rest bearing recess means of like V-shape form with axially outward facing rim portions tapering at the same steep angle to the said horizontal axis of rotation of said reel means to form tapered rest bearing surface means, and a molded plastic spindle slidably fitted and axially and rotatively locked in place within the said bore opening of said reel means and having axially aligned circular outer end bearing portions at its opposite ends projecting outwardly beyond the opposite sides of said reel means and journaled in said trunnion bearing recess means, said spindle end bearing portions being of axially inward facing like tapered form tapering at the same steep angle to the said axis of rotation of said reel means as said tapered V-shape form trunnion rest bearing surface means and in wedged rest bearing engagement only with the upwardly flaring side portions thereof.

29. A support device as defined in claim 28, wherein the said tapered V-shape form trunnion rest bearing surface means and the said tapered spindle end bearing portions in bearing engagement therewith are tapered at corresponding angles ranging between 60° to 70° to the said angle of rotation of said reel means.

30. A support device as defined in claim 28, wherein the said tapered V-shaped form trunnion rest bearing surface means and the said tapered spindle end bearing portions in bearing engagement therewith are tapered at corresponding angles of around 65° to the said axis of rotation of said reel means.

31. A support device as defined in claim 28, wherein the said support post members are formed of molded nylon thermoplastic and the said spindle is formed of molded acetal thermoplastic.

32. A support device as defined in claim 28, wherein the said tapered spindle end bearing portions are both spaced equally above arcuate bight portions of the said V-shape form trunnion rest bearing surface means which join the two upwardly flaring side portions of the respective said trunnion rest bearing surface means at the bottoms of their V-shape form.

33. A support device as defined in claim 28, wherein the said flaring side portions of both said tapered V-shape trunnion rest bearing surface means are flared upwardly and outwardly at equal angles ranging from about 15° to 25° to the vertical.

34. A support device as defined in claim 28, wherein the said flaring side portions of both said tapered V-shape trunnion rest bearing surface means are flared upwardly and outwardly at equal angles of about 18° to the vertical.

35. A support device as defined in claim 28, wherein the said circular outer end bearing portions of said spindle are formed with respective annular bearing grooves the axially inward facing sides of which form the said axially inward tapered spindle end bearing portions.

36. A support device as defined in claim 28, wherein the said spindle and reel means are axially locked together by locking means comprising an annular flange located on one end of said spindle axially inward of the said spindle end bearing portion at said one spindle end and abutting against the adjacent one end of the said hub of said reel means, and a first cantilever spring arm on said spindle extending axially thereof and having a detent on its free end snap locked over the other end of the said hub.

37. A support device as defined in claim 36, wherein the said first cantilever spring arm is integrally molded on said spindle.

38. A support device as defined in claim 36, wherein said spindle is provided with a second cantilever spring arm extending axially thereof at a location therearound approximately diametrically opposite said first cantilever spring arm and provided with a detent at its free end located generally midway of the axial extent of said spindle for engaging with the said hub of narrower width said reel means mounted on said spindle.

39. A support device as defined in claim 38, wherein said second cantilever spring arm is also integrally molded on said spindle.

40. A support device as defined in claim 36, wherein the said spindle and reel means are rotatively locked against relative rotational movement by interlocking means comprising a locking arm integrally molded on said spindle and extending radially outward from the said annular flange on said spindle and provided at its radially outer end with a locking pin extending axially inward of the spindle and slidably fitted within a matching recess provided in the adjacent facing side of said reel means.

41. A support device as defined in claim 28, wherein the said spindle and reel means are rotatively locked against relative rotational movement by interlocking means comprising a locking arm extending radially outward from one end of said spindle and located axially inward of the said outer end bearing portion of the said one spindle end and provided with a locking pin extending axially inward of the spindle and slidably fitted within a matching recess provided in the adjacent facing side of said reel means.

42. A spindle for mounting a reel means for rotation about its axis, said spindle comprising an elongated molded plastic member having a longitudinally extending axis of rotation and axially aligned circular bearing portions at its opposite ends for supporting the spindle for rotation about its said axis of rotation, said circular bearing portions comprising axially inward facing annular bearing surfaces tapered at the same relatively steep angle to said axis of rotation; and locking means for axially locking the spindle in place in an axially extending bore opening in a hub on the reel means, said locking means comprising a radially outward extending annular flange provided on one end of the spindle at a location thereon axially inward adjacent the said circular bearing portion at said one end of the spindle for abutting engagement with one end of the said hub of said reel means, and an axially extending first cantilever spring arm integrally molded on said spindle and recessed in an axially extending recessed portion thereof, said spring arm extending axially toward the other end of said spindle and provided with a detent at its free end for snap-locking engagement over the other end of said hub.

43. A spindle as defined in claim 42, wherein the said axially inward facing annular bearing surfaces are tapered at the same angle ranging from 60° to 70° to the said axis of rotation of said spindle.

44. A spindle as defined in claim 42, wherein the said axially inward facing annular bearing surfaces are tapered at the same angle of approximately 65° to the said axis of rotation of said spindle.

45. A spindle as defined in claim 42, wherein the said circular bearing portions at the opposite ends of the spindle are comprised of identical annular bearing grooves in the respective spindle ends the axially inward facing sides of which grooves comprise the said axially inward facing tapered spindle bearing surfaces.

46. A spindle as defined in claim 42, and further including a second cantilever spring arm integrally molded on said spindle at a location therearound approximately diametrically opposite said first cantilever spring arm and recessed in another axially extending recessed portion of said spindle, and second spring arm extending toward the other end of said spindle and provided with a detent at its free end located generally midway of the axial extent of said spindle for engaging with the said hub of narrower width said reel means mounted on said spindle.

47. A spindle as defined in claim 46, and further including interlocking means for rotatively locking said spindle to said reel means against relative rotational movement, said interlocking means comprising a locking arm integrally molded on said spindle and extending radially outward from the said annular flange on said spindle and provided at its radially outer end with a locking pin extending axially inward of the spindle for slidably fitting within a matching recess provided in a facing side of said reel means.

48. A spindle as defined in claim 42, and further including interlocking means for rotatively locking said spindle to said reel means against relative rotational movement, said interlocking means comprising a locking arm extending radially outward from one end of said spindle and located axially inward of the said circular bearing portion at the said one spindle end and provided with a locking pin extending axially inward of the spindle for slidably fitting within a matching recess provided in a facing side of said reel means.

49. A spindle as defined in claim 42, and further including interlocking means for rotatively locking said spindle to said reel means against relative rotational movement, said interlocking means comprising a locking arm extending radially outward from one end of said spindle and located axially inward of the said circular bearing portion at the said one spindle end and provided with a locking pin extending axially inward of the spindle for slidably fitting within a matching recess provided in a facing side of said reel means.

* * * * *